(12) United States Patent
Colomb et al.

(10) Patent No.: US 12,485,749 B2
(45) Date of Patent: Dec. 2, 2025

(54) TRANSMISSION SYSTEM INCLUDING A DIFFERENTIAL DRIVE DEVICE

(71) Applicant: VALEO EMBRAYAGES, Amiens (FR)

(72) Inventors: Pierre Colomb, Cergy Pontoise (FR); Thierry Lanoe, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/720,155

(22) PCT Filed: Dec. 16, 2022

(86) PCT No.: PCT/EP2022/086340
§ 371 (c)(1),
(2) Date: Jun. 14, 2024

(87) PCT Pub. No.: WO2023/111261
PCT Pub. Date: Jun. 22, 2023

(65) Prior Publication Data
US 2025/0042247 A1    Feb. 6, 2025

(30) Foreign Application Priority Data
Dec. 17, 2021  (FR) ...................................... 2113771

(51) Int. Cl.
*F16H 48/34*   (2012.01)
*B60K 17/02*   (2006.01)
(Continued)

(52) U.S. Cl.
CPC ............ B60K 17/165 (2013.01); B60K 17/02 (2013.01); F16C 19/10 (2013.01); F16H 48/08 (2013.01);
(Continued)

(58) Field of Classification Search
CPC ........ F16H 48/08; F16H 48/40; F16H 57/042; F16H 57/0471; F16H 48/24; F16H 48/34;
(Continued)

(56) References Cited

U.S. PATENT DOCUMENTS 5,337,871 A * 8/1994 Testerman ............ F16D 25/123
192/85.61
6,019,694 A    2/2000 Forrest et al.
(Continued)

FOREIGN PATENT DOCUMENTS

CN         211009634 U    7/2020
CN         113090732 A    7/2021
(Continued)

OTHER PUBLICATIONS

Machine translation for IDS cited art JPS61109914A, pp. 1-2 (Year: 2025).*
(Continued)

*Primary Examiner* — Tisha D Lewis
(74) *Attorney, Agent, or Firm* — Oblon, McClelland, Maier & Neustadt, L.L.P.

(57) ABSTRACT

Transmission system for a motor vehicle includes a differential drive device configured to distribute a torque to two wheel shafts of an axle, and which includes a coupling device having a coupled position in which the transmission of the torque via the differential drive device is provided and a decoupled position in which the transmission of the torque via the differential drive device is interrupted. The coupling device includes an actuator including a piston guided in axial translation between a retracted position and an extended position; and a thrust bearing which is inserted between the piston and a first coupling part of the coupling device so as to transmit an actuating force of the piston to the first coupling portion and to move the first coupling portion (Continued)

from the uncoupled position to the coupled position during the movement of the piston from the retracted position to the extended position.

19 Claims, 5 Drawing Sheets

(51) Int. Cl.
    *B60K 17/16*     (2006.01)
    *F16C 19/10*     (2006.01)
    *F16H 48/08*     (2006.01)
    *F16H 48/40*     (2012.01)
    *F16H 57/04*     (2010.01)
    *F16H 48/24*     (2006.01)

(52) U.S. Cl.
    CPC ............ *F16H 48/40* (2013.01); *F16H 57/042* (2013.01); *F16H 57/0471* (2013.01); *F16C 2361/61* (2013.01); *F16H 48/24* (2013.01); *F16H 48/34* (2013.01); *F16H 2048/405* (2013.01)

(58) Field of Classification Search
    CPC . F16H 2048/405; B60K 17/165; B60K 17/02; F16C 19/10; F16C 2361/61
See application file for complete search history.

(56) References Cited

U.S. PATENT DOCUMENTS

| 7,086,978 | B2* | 8/2006 | Aikawa | B60W 10/02 |
| | | | | 475/5 |
| 2006/0211532 | A1* | 9/2006 | Krisher | F16H 48/295 |
| | | | | 475/231 |
| 2017/0108103 | A1* | 4/2017 | Cooper | F16H 37/0813 |
| 2017/0198798 | A1* | 7/2017 | Ziech | B60K 17/3462 |

FOREIGN PATENT DOCUMENTS

| JP | 61-109914 A | 5/1986 |
| WO | WO 2012/053409 A1 | 4/2012 |

OTHER PUBLICATIONS

International Search Report issued Mar. 22, 2023 in PCT/EP2022/086340, filed on Dec. 16, 2022, citing documents 1 & 15-18 therein, 3 pages.

* cited by examiner

TRANSMISSION SYSTEM INCLUDING A DIFFERENTIAL DRIVE DEVICE

TECHNICAL FIELD

The invention relates to the field of drivetrains for motor vehicles.

It relates more particularly to a transmission system comprising a differential drive device aimed at transmitting and distributing torque originating from a power unit to two half-shafts of an axle of the vehicle. The differential drive device comprises a first element intended to be driven by a power unit and a second element intended to drive one and/or the other of the two half-shafts of the axle of the vehicle, as well as a coupling device able selectively to couple the first element to the second element.

TECHNOLOGICAL BACKGROUND

Document US2015114786 discloses a transmission system comprising a differential drive device equipped with a coupling device which is able either to transmit torque through the differential drive device or interrupt the transmission of torque. The differential drive device comprises a differential case, movable in rotation about an axis A, and which is equipped with a gear wheel driven by a power unit of the vehicle. Housed inside the case there are a supporting ring guided in rotation in the case, two planet pinions mounted with the ability to rotate on the supporting ring about an axis B perpendicular to the axis A, and two sun gears each of which meshes with the two planet pinions and each of which is secured, for conjoint rotation, to one of the half-shafts. Moreover, the coupling device can be used either to couple the differential case to the supporting ring so as to transmit and distribute the torque from the power unit to the two half-shafts of the axle, or to uncouple these so as to interrupt the transmission of torque between the power unit and the half-shafts.

The coupling device is a claw coupling device. It comprises a first coupling part having an annular portion arranged on the outside of the differential case, and projecting elements which extend from the annular portion and pass through orifices formed in the case, thereby enabling the first coupling part and the differential case to be secured against mutually independent rotation. The projecting elements comprise toothsets which are intended to engage with complementary grooves formed on the supporting ring. The first coupling part is axially mobile with respect to the case between an uncoupled position and a coupled position in which the toothsets of the first coupling part engage with the grooves of the supporting ring.

An electromagnetic actuator is able to apply axial force to the first coupling part so as to move it from the uncoupled position to the coupled position. The actuator comprises a piston which is guided axially in translation and which presses axially against the first coupling part so as to move it between the coupled position and the uncoupled position. The first coupling part is movable in rotation with respect to the piston because the actuator is mounted fixedly in terms of rotation on a casing of the transmission system whereas the first coupling part is secured in terms of rotation to the differential case and, therefore, able to rotate about the axis A. Hence, in order to reduce the wear caused by the relative rotational movement of the piston and the first coupling part, the piston is in contact with the first coupling part via a slip disk made from a material having a low coefficient of friction, such as bronze.

Such a transmission system is not entirely satisfactory.

Specifically, the applicant company has noticed that while the slip disk interposed between the piston and the first coupling part does enable a reduction in wear, the friction torque that opposes the relative rotational movement of the first coupling part with respect to the piston remains too high. This friction generates a drag torque which increases the energy consumption of the power unit coupled to the differential drive device.

SUMMARY

One idea behind the invention is that of proposing a transmission system of the aforementioned type that is able to overcome the disadvantages of the prior art by offering better energy efficiency.

According to one embodiment, the invention provides a transmission system for a motor vehicle, comprising:
  a differential drive device which is configured to distribute torque to two half-shafts of an axle of the vehicle, the differential drive device comprising a first element and a second element which are able to move in rotation about an axis X, the first element being intended to be driven by a power unit and the second element being intended to drive at least one of the two half-shafts; the differential drive device comprising a coupling device which comprises a first coupling part which is secured in terms of rotation to the first element, and a second coupling part which is secured in terms of rotation to the second element, the first coupling part being able to move axially with respect to the first element between a coupled position in which the first coupling part is coupled with the second coupling part so as to transmit torque between the first element and the second element, and an uncoupled position in which the first coupling part and the second coupling part are uncoupled from one another, the coupling device further comprising an actuator comprising:
  a piston guided in axial translation between a retracted position and an extended position; and
  a thrust rolling bearing which is interposed between the piston and the first coupling part so as to transmit an actuating force from the piston to the first coupling part and move the first coupling part from the uncoupled position to the coupled position as the piston moves from the retracted position to the extended position.

Thus, the use of a rolling thrust bearing between the piston of the actuator and the first coupling part makes it possible to reduce the drag torque of the transmission system appreciably and thus improve the energy efficiency thereof.

According to various embodiments, such a transmission system may have one or more of the following features.

According to one embodiment, the piston is fixed in terms of rotation with respect to the axis X.

According to one embodiment, the coupling device comprises elastic return means which are designed to return the first coupling part to the uncoupled position.

According to one embodiment, the actuator is an electromagnetic actuator. Such an actuator is particularly advantageous in that it exhibits excellent responsiveness.

According to one embodiment, the actuator comprises an electromagnet which is able to move the piston between the retracted position and the extended position and inside which the piston is guided in translational movement, the piston having a body made of ferromagnetic material.

According to one embodiment, the electromagnet comprises a magnetic field frame and a coil housed inside the magnetic field frame.

According to one embodiment, the electromagnet has the overall shape of an annulus about the axis of rotation X.

According to one embodiment, the magnetic field frame is fixed axially and circumferentially on a casing of the transmission system.

According to one embodiment, the actuator comprises a magnetic cap against which the body of the piston comes into abutment when the piston is in the extended position. Thus, the magnetic cap keeps the piston in the extended position so that the intensity of the electromagnet supply current can be lowered.

According to one embodiment, the piston and the electromagnet are positioned respectively radially one inside the other or axially one beside the other.

According to one embodiment, the thrust rolling bearing comprises a first ring, a second ring and rolling bodies interposed between the first and second rings, the first ring and the second ring of the thrust rolling bearing pressing respectively, either directly or indirectly, against the piston and against the first coupling part.

According to one embodiment, the rolling bodies are interposed axially between the first ring and the second ring.

Advantageously, the first ring and the second ring press axially against one another via the rolling bodies.

According to one embodiment, the thrust rolling bearing is in contact with the piston only via the first ring and the thrust rolling bearing is in contact with the first coupling part only via the second ring.

According to one embodiment, the first ring of the thrust rolling bearing is fitted around the piston in such a way as to be centered relative to the actuator.

According to one embodiment, a first shoulder of the piston defines, for the first ring, an internal journal surface and an axial thrust surface. Specifically, the first ring of the thrust rolling bearing is axially in abutment against the axial thrust surface and has a radially internal edge that collaborates with the internal journal surface. The first shoulder is oriented toward the first ring. Thus, axial load is transmitted via the first shoulder.

According to one embodiment, the magnetic cap has an abutment surface against which a second shoulder of the body of the piston comes into abutment when the piston is in the extended position.

According to one embodiment, the abutment surface is formed by a shoulder of the magnetic cap.

According to one embodiment, the second ring of the thrust rolling bearing is centered with respect to the first coupling part.

According to one embodiment, the first coupling part comprises a disk, the disk comprising a plurality of tabs which extend axially and are distributed about the axis X, said tabs collaborating with a radially internal edge or with a radially external edge of the second ring in order to center same.

According to one embodiment, the first ring is made from non-magnetic material. This prevents the first ring, which is the one closest to the magnetic field generated by the electromagnet, from becoming magnetized and thus attracting metallic debris that could jam the thrust rolling bearing. This also makes it possible to limit the loss of magnetic flux toward the other components of the transmission system.

According to one embodiment, the first ring, the second ring and the rolling bodies are each made from a non-magnetic material. This prevents the thrust rolling bearing from becoming magnetized and limits still further the losses of magnetic flux to the other components of the transmission system.

According to one embodiment, the thrust rolling bearing comprises a cage which is interposed between the first ring and the second ring and which is designed to hold and guide the rolling bodies.

According to one embodiment, the cage is made from a non-magnetic material selected from stainless steel, brass, polymers and ceramics.

According to one embodiment, the first ring and/or the second ring are made from non-magnetic material, for example of stainless steel or ceramic.

According to one embodiment, the rolling bodies are made from a non-magnetic material selected from stainless steel and ceramics.

According to one embodiment, the piston comprises an end portion which collaborates with the thrust rolling bearing and which comprises one or more passages passing radially through it so as to allow lubricant to circulate radially through the piston. Thus, the passage is formed in the end portion of the piston allow the lubricant contained in the casing of the transmission system to reach the space created radially between the thrust rolling bearing and the lateral sleeve of the part of the differential case, the lubricant then being thrown out centrifugally from said space toward the thrust rolling bearing. This ensures adequate lubrication of the thrust rolling bearing.

According to another embodiment, of the first ring and the second ring of the thrust rolling bearing at least one, preferably the first ring, comprises one or more passages passing radially through it so as to allow lubricant to circulate radially through said first or second ring.

According to one embodiment, the first element comprises a differential case inside which the second coupling part is housed, the first coupling part comprising an interior portion which is housed inside the differential case, an exterior portion which is positioned outside the differential case and a plurality of connecting portions which axially connect the interior portion and the exterior portion of the first coupling part, each of the connecting portions passing through a corresponding through-opening made in the differential case.

According to one embodiment, the second element comprises a supporting ring which is guided in rotation about the axis X inside the differential case, two planet pinions which are mounted to rotate on the supporting ring about an axis Y perpendicular to the axis X, and two sun gears which are able to rotate about the axis X, are each in mesh with the two planet pinions and are each intended to be secured in terms of rotation, to one of the two half-shafts.

According to one embodiment, the first coupling part comprises a disk which has a target-forming annular portion, said target being arranged axially facing a sensor which is configured to deliver a signal indicative of an axial distance between the target and the sensor.

According to one embodiment, the disk is fixed to the exterior portion of the first coupling part.

BRIEF DESCRIPTION OF THE FIGURES

The invention will be better understood, and other aims, details, features and advantages thereof will become clearer, from the following description of several particular embodiments of the invention, provided solely by way of non-limiting illustration, with reference to the attached drawings.

DESCRIPTION OF THE EMBODIMENTS

In the description and the claims, the terms "external" and "internal" and the orientations "axial" and "radial" will be used to denote elements of the transmission system according to the definitions given in the description. By convention, the axis X of rotation of the differential case defines the "axial" orientation. The "radial" orientation is directed orthogonally to the axis X and from the inside toward the outside moving away from said axis X.

Figure 1:
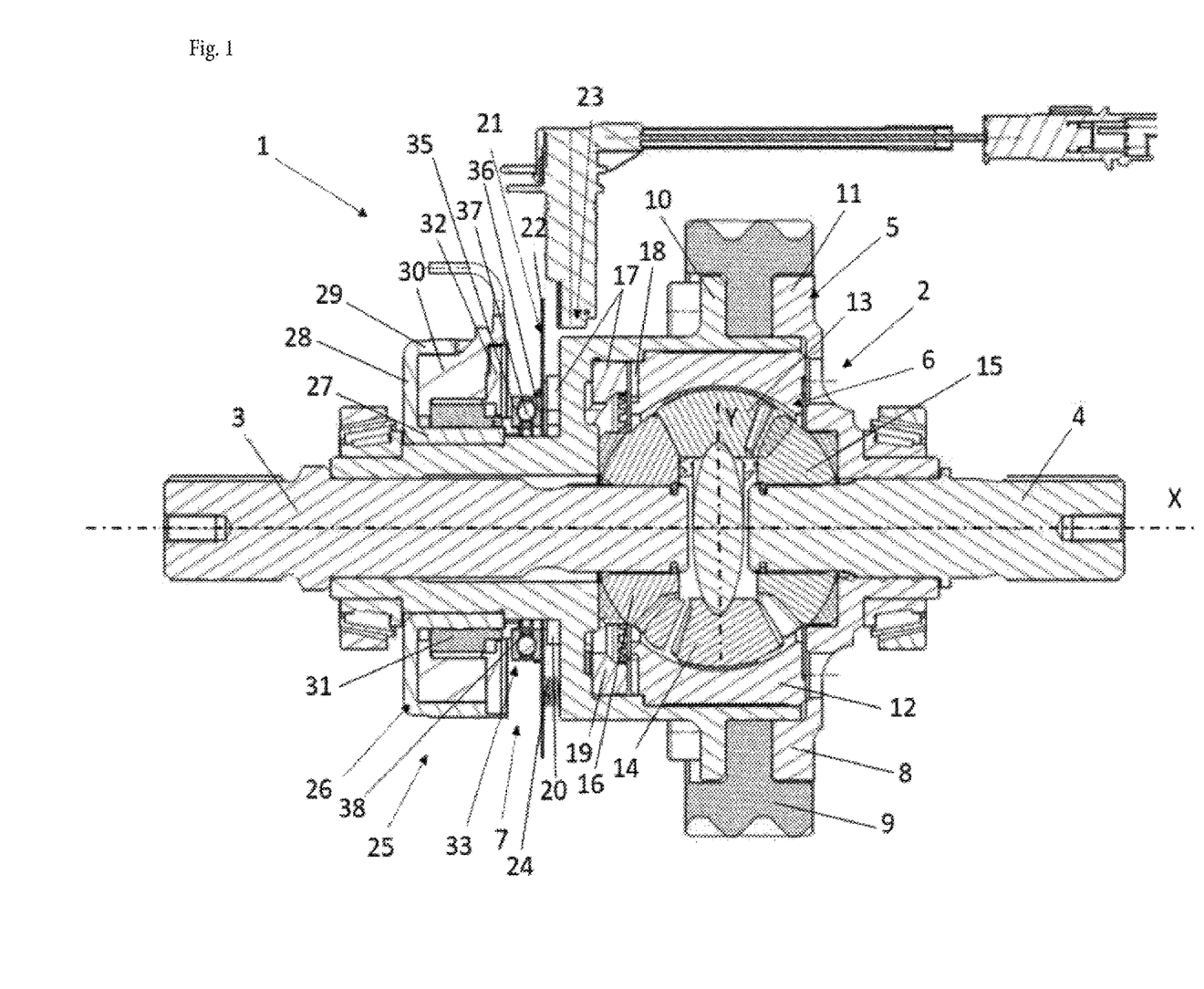
FIG. 1 is a view, in cross section, of a transmission system comprising a differential drive device and a coupling device.

FIG. 1 illustrates a transmission system 1 according to a first embodiment. The transmission system 1 comprises a differential drive device 2. The differential drive device 2 is intended to drive the rotation of two half-shafts 3, 4 of an axle of a vehicle and is configured to distribute torque coming from a power unit, not illustrated, to the two half-shafts 3, 4, allowing them to rotate at different speeds.

According to one embodiment, such a transmission system 1 is intended for a hybrid vehicle. Thus, the transmission system 1 is, for example, able to transmit a torque from an electric motor to a rear or front axle of the vehicle, while another transmission system, coupled to another power unit, such as a combustion engine, is able to generate a torque and transmit it between this other power unit and the two half-shafts of the other axle of the vehicle. The vehicle may also be fully electric.

The differential drive device 2 comprises a first element 5, able to rotate about the axis X, which is intended to be kinematically coupled to a power unit via a reducer device, not depicted. The differential drive device 2 also comprises a second element 6, likewise able to rotate about the axis X and intended to drive the half-shafts 3, 4.

The transmission system 1 also comprises a coupling device 7 able selectively to couple or uncouple the first element 5 and the second element 6 of the differential drive device 2.

The first element 5 of the differential drive device 2 comprises a differential case 8 as well as a driving gearwheel 9 which is securely fixed, for conjoint rotation therewith, to said differential case 8. The differential case 8 comprises two parts 10, 11 which are fixed to one another and to the driving gearwheel 9. In the embodiment depicted, each of the two parts 10, 11 of the differential case 8 is flanged. The aforementioned two flanges sandwich an internal flange of the driving gearwheel 9. Fasteners, such as screws, not visible in FIG. 1, pass through the flanges of two parts 10, 11 of the differential case 8 and through the internal flange of the driving gearwheel 9 in order to fix these parts together.

The second element 6 of the differential drive device 2 comprises a supporting ring 12 of annular shape, which is guided in rotation, about the axis X, inside the differential case 8. For this purpose, the differential case 8 has an internal cylindrical portion collaborating with a cylindrical external surface of the supporting ring 12. The second element 6 further comprises two planet pinions 13, 14 as well as two sun gears 15, 16. The planet pinions 13, 14 are mounted with the ability to rotate on the supporting ring 12 about an axis Y perpendicular to the axis X. The two planet pinions 13, 14 each have bevel gear teeth meshing with complementary bevel gear teeth belonging to the two sun gears 15, 16. The two sun gears 15, 16 are rotationally mobile about the axis X and are each secured, in terms of rotation, to one of the two half-shafts 3, 4. The supporting ring 12, the planet pinions 13, 14 and the sun gears 15, 16 thus form a differential allowing the two half-shafts 3, 4 to rotate at different speeds.

The coupling device 7 is configured to selectively transmit torque between the differential case 8 and the supporting ring 12. Thus, when the coupling device 7 is in the coupled position, the transmission system 1 allows torque to be transmitted between the power unit and the half-shafts 3, 4, while acting as a differential to allow the two half-shafts 3, 4 different rotational speeds. When the coupling device 7 is in the uncoupled position, transmission between the power unit and the half-shafts 3, 4 is interrupted.

In another embodiment (not shown), the coupling device 7 is configured to couple the first element 5 to one of the two sun gears 15, 16. In such an embodiment, the supporting ring 12 is secured, in terms of rotation, to the differential case 8 or else the two planet pinions 13, 14 are mounted to rotate directly on the differential case 8. Such a coupling device 7 is therefore aimed at preventing the two half-shafts 3, 4 from rotating at different speeds (differential locking).

The coupling device 7 comprises a first coupling part 17 which is secured, in terms of rotation, to the differential case 8, while at the same time being capable of moving axially with respect thereto. The first coupling part 17 is able to move between an uncoupled position and a coupled position. In the coupled position, the first coupling part 17 is coupled, in terms of rotation, to a second coupling part 18 secured, in terms of rotation, to the supporting ring 12, thereby allowing torque to be transmitted between the differential case 8 and the supporting ring 12. By contrast, in the uncoupled position, the first coupling part 17 is uncoupled from the second coupling part 18 so that the transmission of torque between the differential case 8 and the supporting ring 12 is interrupted.

The coupling device 7 is, for example, a claw coupling device. Thus one of the first and second coupling parts 17, 18 comprises teeth while the other comprises corresponding slots into which said teeth engage when the first coupling part 17 is in the coupled position. In the embodiment depicted, the second coupling part 18 is formed of one piece with the supporting ring 12. In other words, teeth or slots are formed in the lateral face of the supporting ring 12 which faces toward the first coupling part 17. However, although the invention has been described in connection with a claw-type coupling device, it is not restricted thereto, and the coupling device 7 could be of another type and notably a friction coupling device.

The first coupling part 17 comprises an interior portion 19, an exterior portion 20 which is positioned outside the differential case 8, and connecting portions, not visible, which are evenly distributed about the axis X and each pass through a corresponding through-opening, not visible, formed in the part 10 of the differential case 8. The aforementioned connecting portions thus allow the first coupling part 17 to be secured, in terms of rotation, to the differential case 8 while at the same time allowing relative axial movement between the first coupling part 17 and the differential case 8. In one embodiment, the exterior portion 20 is annular whereas the interior portion 19 comprises lugs extending axially in the continuation of the connecting portions. However, according to another embodiment, the structure is reversed and the interior portion 19 is annular whereas the exterior portion 20 comprises a plurality of axially oriented tabs extending in the continuation of the connecting portions.

The first coupling part 17 also comprises a disk 21 which is fixed to the exterior portion 20. This disk 21 acts as a target. For this purpose, the disk 21 comprises an annular portion 22 formed of the radially external periphery of the disk 21. This annular portion 22 is positioned axially facing a sensor 23 and thus forms the target. The sensor 23 is a contactless sensor which is configured to deliver a signal indicative of the axial distance between the target and the sensor 23. Thus, the sensor 23 is able to deliver a signal indicative of the position of the first coupling part 17, such a signal being used to ensure the reliability of the command issued to the coupling device 7 and notably to verify that the coupling device 7 is indeed in the uncoupled position or in the coupled position. The sensor 23 is, for example, a Hall effect sensor.

The coupling device 7 further comprises elastic return means which are designed to return the first coupling part 17 to the uncoupled position. In the embodiment depicted, the elastic return means comprise helical springs 24 which have a first end pressing against the disk 21 and a second end pressing against the differential case 8. In an alternative embodiment, the return means are formed by blades incorporated into the disk 21 and pressing against the differential case 8.

Moreover, the coupling device 7 comprises an actuator 25 allowing the first coupling part 17 to be moved axially between the coupled position and the uncoupled position. The actuator 25 is an electromagnetic actuator.

Figure 2:
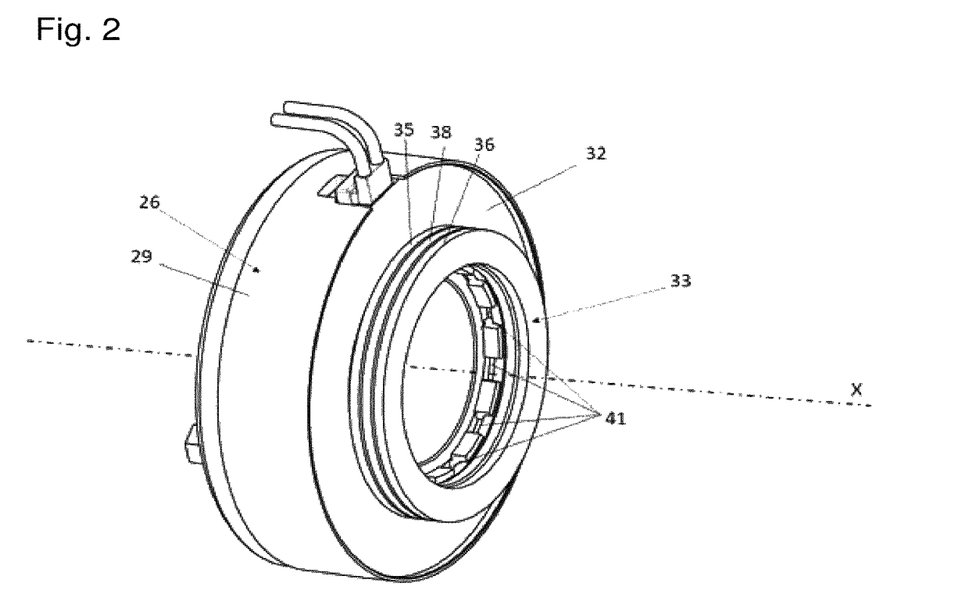
FIG. 2 is a view, in perspective, of the actuator of the coupling device of FIG. 1.
Figure 3:
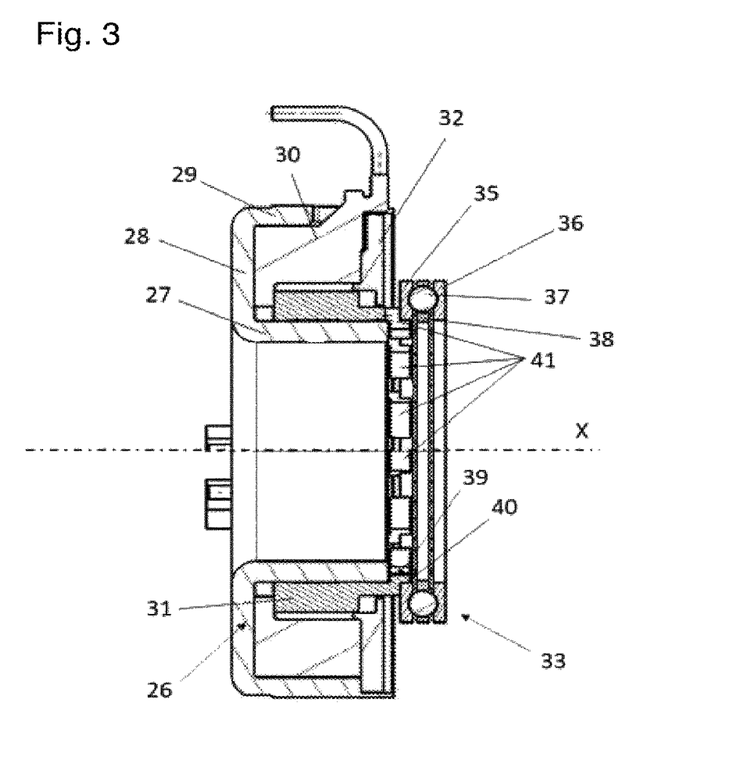
FIG. 3 is a view, in cross section, of the actuator of FIG. 2.

The actuator 25 comprises an electromagnet comprising a magnetic field frame 26 which is mounted so that it is fixed axially and circumferentially about the axis X, on a casing of the transmission system 1, not depicted. The magnetic field frame 26 is of annular shape. It concentrates and guides the magnetic flux generated by the coil. The magnetic field frame 26 has an internal skirt 27, a radially oriented end wall 28, and an external skirt 29 and these together define an annular space. The internal skirt 27 is fitted around a lateral sleeve of the part 10 of the differential case 8, while still allowing the lateral sleeve and, therefore, the differential case 8, to rotate with respect to the magnetic field frame 26 of the actuator 25, about the axis X.

The electromagnet also comprises a coil 30 which is housed in the magnetic field frame 26. The coil 30 defines, in the annular space of the magnetic field frame 26, an internal housing inside which a piston 31 is guided axially in translation between a retracted position and an extended position. The actuator 25 further comprises a cap 32, preferably a magnetic cap, which closes the internal housing. The cap 32 comprises an abutment surface which is intended to collaborate with an abutment surface of the piston 31 in order to define the deployed position of the piston 31.

The piston 31 comprises a body, of annular shape, made of ferromagnetic material such as iron or steel for example.

The actuator 25 also comprises a thrust rolling bearing 33 which is interposed between the piston 31 and the first part of the coupling device 7 thus allowing the force of actuation of the piston 31 to be transmitted to the first coupling part 17. Such a thrust rolling bearing 33 is particularly advantageous in that it allows the friction losses in the transmission system 1 to be reduced. The thrust rolling bearing 33 comprises two radially oriented rings, namely a first ring 35, a second ring 36 and rolling bodies 37 interposed between the first and second rings 35, 36. The rolling bodies 37 here are balls but may also be rollers or needles in particular. In the embodiment depicted, the thrust rolling bearing 33 also comprises a cage 38 which is interposed between the first ring 35 and the second ring 36 and which comprises a plurality of pockets housing the rolling bodies 37 so as to retain and guide the rolling bodies 37.

As a preference, the rolling bodies 37 are interposed axially between the first ring 35 and the second ring 36. Advantageously, the first ring 35 and the second ring 36 press axially against one another via the rolling bodies 37. It may be seen that the thrust rolling bearing 33 is in contact with the piston only via the first ring 35 and the thrust rolling bearing 33 is in contact with the first coupling part only via the second ring 36.

At least the first ring 35, and preferably the entirety of the thrust rolling bearing 33, is made from one or more non-magnetic materials. This prevents the thrust rolling bearing 33 from becoming magnetized under the effect of the magnetic field generated by the electromagnet 30 of the actuator 25, which magnetization would lead to a build-up of metallic debris on the thrust rolling bearing 33, thus impairing its operation. This also prevents undesirable loss of magnetic flux toward the other components of the transmission system 1. According to one embodiment example, the first ring 35 and/or the second ring 36 are made from stainless steel or ceramic. The rolling bodies 37 may also be made of stainless steel or else of ceramic. The cage 38 is also made from non-magnetic materials selected from stainless steel, brass, polymers, such as glass-fiber reinforced polyamide 6,6, and ceramics.

The first ring 35 and the second ring 36 of the thrust rolling bearing 33 press respectively against the piston 31 of the actuator 25 and against the first coupling part 17. As depicted in FIG. 3, the piston 31 has an end portion 39 that projects toward the first coupling part 17 beyond the magnetic field frame 26. The end portion 39 comprises a first shoulder 40 which defines a cylindrical, internal, journal surface and an axial thrust surface. The first ring 35 of the thrust rolling bearing 33 is fitted onto the end portion 39. More particularly, the first ring 35 is axially in abutment against the axial thrust surface, while the radially internal edge of the first ring 35 engages with the internal journal surface so as to center the thrust rolling bearing 33 relative to the actuator 25.

Figure 4:
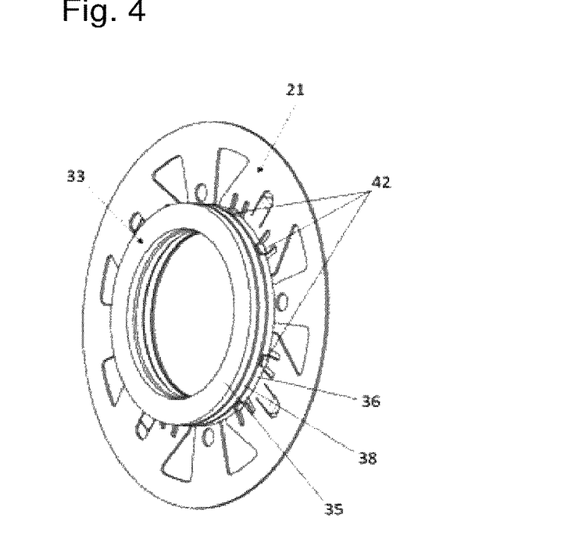
FIG. 4 is a view, in perspective, illustrating the centering of a rolling bearing of the actuator with respect to the first element of the coupling device, according to a first embodiment variant.

Moreover, as illustrated in FIG. 4, the end portion 39 of the piston 31 comprises one or more passages 41 passing radially through it. Thus, these passages 41 allow the lubricant contained in the casing of the transmission system to reach the space created radially between the thrust rolling bearing 33 and the lateral sleeve of the part 10 of the differential case 8. Upon contact with the lateral sleeve of the part 10 of the differential case 8 which is made to rotate by the power unit, the lubricant is thrown out centrifugally, making it possible to lubricate the rolling bodies 37, the first ring 35 and the second ring 36 of the rolling bearing 33.

Moreover, in addition or as an alternative to the centering of the first ring 35 with respect to the piston 31, the second ring 36 is centered with respect to the first coupling part 17 and more particularly with respect to the disk 21. In order to do this, in the embodiment illustrated in FIGS. 4 and 5, the disk 21 comprises a plurality of tabs 42 which extend axially and are uniformly distributed about the axis X. The tabs 42 collaborate with the radially external edge of the second ring 36 in order to center same.

Figure 5:
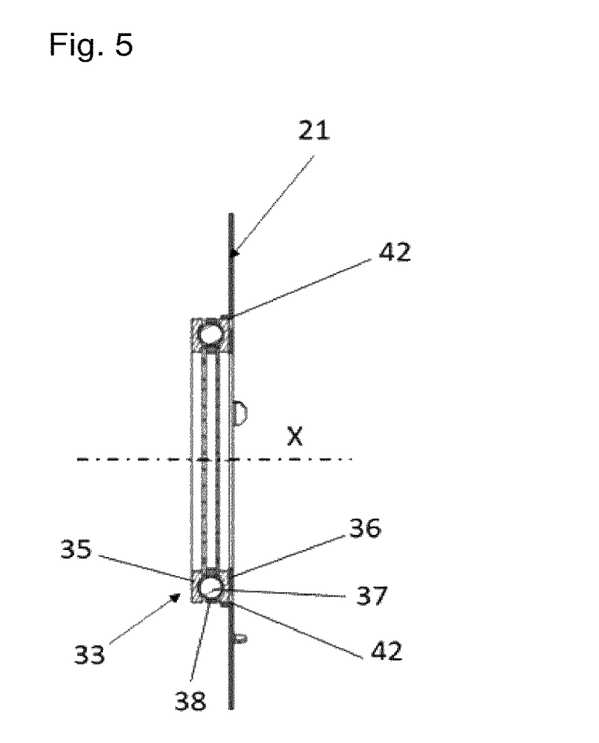
FIG. 5 is a view, in cross section, of the elements of FIG. 4.
Figure 6:
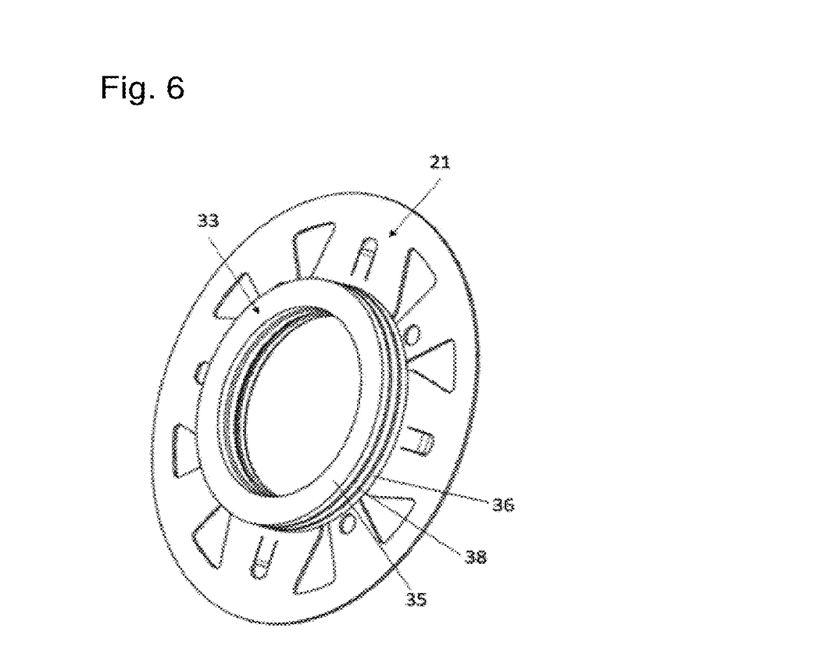
FIG. 6 is a view, in perspective, illustrating the centering of a rolling bearing of the actuator with respect to the first element of the coupling device, according to a second embodiment variant.
Figure 7:
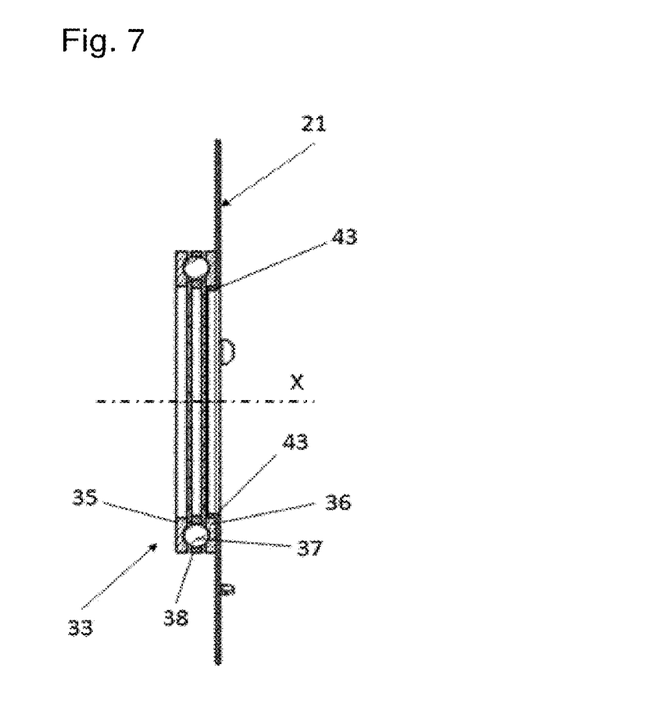
FIG. 7 is a view, in cross section, of the elements of FIG. 6.

The embodiment depicted in FIGS. 6 and 7 differs from the one described hereinabove in relation to FIGS. 4 and 5 in that the tabs 43 that extend axially and are distributed about the axis X do not collaborate with the radially external edge of the second ring 36 but with the radially internal edge thereof in order to center same.

According to an embodiment which has not been depicted, the piston 31 comprises a non-magnetic endpiece which is fixed to the body, made of ferromagnetic material, of the piston 31. The non-magnetic endpiece forms the end portion 39 of the piston 31 by means of which the actuation force is transmitted to the first coupling part 17. This makes it possible to limit still further the undesirable loss of magnetic flux toward the other components of the transmission system.

Figure 8:
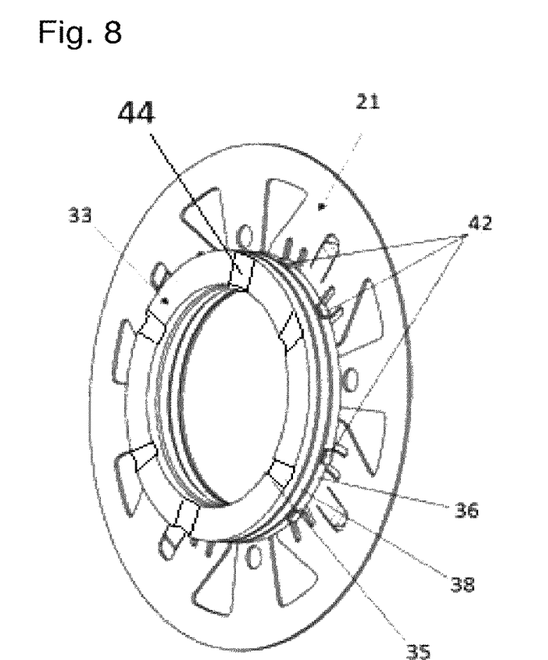
FIG. 8 is a view, in perspective, of a rolling bearing of the actuator according to an embodiment variant.

In the embodiment variant depicted in FIG. 8, the first ring 35 of the thrust rolling bearing 33 has one or more passages 44 passing radially through it. These passages 44 have the same functionality as those referenced 41 in FIG. 4, which is to say that of allowing the lubricant contained in the casing of the transmission system to reach the space created radially between the thrust rolling bearing 33 and the lateral sleeve of the part 10 of the differential case 8. The passages 44 formed in the first ring 35 may be used as an alternative to or to supplement the passages 41 formed in the piston 31.

The operation of the actuator 25 is as follows. When the electromagnet is powered with a current stronger than a threshold current, it allows the piston 31 to be moved from the retracted position to the extended position. When the piston 31 is in the extended position, the magnetic cap 32 exerts an attraction on the body of the piston 31, enabling it to be held in the extended position. The strength of the current with which the electromagnet is powered can then be reduced so long as it remains above said threshold current strength. When the electromagnet is unpowered, or is powered with a current of a strength lower than the threshold current strength, the return members are able to overcome the force of attraction between the cap 32 and the body of the piston 31, enabling the piston 31 to be returned from the extended position to the retracted position.

Although the invention has been described in connection with a plurality of particular embodiments, it is obvious that it is in no way limited thereto and that it comprises all technical equivalents of the means described and combinations thereof where these fall within the scope of the invention as defined in the claims.

Use of the verbs "contain", "comprise" or "include" and their conjugated forms does not exclude the presence of elements or steps other than those described in a claim.

In the claims, any reference sign between parentheses should not be interpreted as limiting the claim.

The invention claimed is:

1. A transmission system for a motor vehicle, comprising:
   a differential drive device which is configured to distribute torque to two half-shafts of an axle of the vehicle, the differential drive device comprising a first element and a second element which are able to move in rotation about an axis X, the first element configured to be driven by a power unit and the second element configured to drive at least one of the two half-shafts, the differential drive device further including a coupling device which comprises a first coupling part which is secured in terms of rotation to the first element, and a second coupling part which is secured in terms of rotation to the second element, the first coupling part configured to move axially with respect to the first element between a coupled position in which the first coupling part is coupled with the second coupling part so as to transmit torque between the first element and the second element, and an uncoupled position in which the first coupling part and the second coupling part are uncoupled from one another and the torque is not transmitted between the first element and the second element, the coupling device further comprising an actuator comprising:
   a piston guided in axial translation between a retracted position and an extended position; and
   a thrust rolling bearing which is interposed between the piston and the first coupling part so as to transmit an actuating force from the piston to the first coupling part and move the first coupling part from the uncoupled position to the coupled position as the piston moves from the retracted position to the extended position,
   wherein the first element comprises a differential case inside which the second coupling part is housed, the first coupling part comprising an interior portion which is housed inside the differential case, an exterior portion which is positioned outside the differential case, and a plurality of connecting portions which axially connect the interior portion and the exterior portion of the first coupling part, each of the connecting portions passing through a corresponding through-opening made in the differential case.

2. The transmission system as claimed in claim 1, wherein the actuator is an electromagnetic actuator.

3. The transmission system as claimed in claim 1, wherein the thrust rolling bearing comprises a first ring, a second ring and rolling bodies interposed between the first and second rings, the first ring and the second ring of the thrust rolling bearing pressing respectively against the piston and against the first coupling part.

4. The transmission system as claimed in claim 3, wherein a first shoulder of the piston defines, for the first ring, an internal journal surface and an axial thrust surface.

5. The transmission system as claimed in claim 3, wherein the second ring of the thrust rolling bearing is centered with respect to the first coupling part.

6. The transmission system as claimed in claim 3, wherein the first ring is made from non-magnetic material.

7. The transmission system as claimed in claim 6, wherein the first ring, the second ring and the rolling bodies are each made from a non-magnetic material.

8. The transmission system as claimed in claim 6, wherein the first ring and the second ring are made of stainless steel and wherein the rolling bodies are made from a non-magnetic material selected from stainless steel and ceramics.

9. The transmission system as claimed in claim 1, wherein the piston comprises an end portion which collaborates with the thrust rolling bearing and which comprises one or more passages passing radially through it so as to allow lubricant to circulate radially through the piston.

10. The transmission system as claimed in claim 3, wherein of the first ring and the second ring of the thrust rolling bearing at least one comprises one or more passages passing radially through it so as to allow lubricant to circulate radially through said first or second ring.

11. The transmission system as claimed in claim 3, wherein the rolling bodies are interposed axially between the first ring and the second ring.

12. The transmission system as claimed in claim 3, wherein the thrust rolling bearing is in contact with the piston only via the first ring and the thrust rolling bearing is in contact with the first coupling part only via the second ring.

13. The transmission system as claimed in claim 1, wherein the second element comprises a supporting ring which is guided in rotation about the axis X inside the differential case, two planet pinions which are mounted to rotate on the supporting ring about an axis Y perpendicular to the axis X, and two sun gears which are able to rotate about the axis X, are each in mesh with the two planet pinions and are each intended to be secured, in terms of rotation, to one of the two half-shafts.

14. The transmission system as claimed in claim 2, wherein the thrust rolling bearing comprises a first ring, a second ring and rolling bodies interposed between the first and second rings, the first ring and the second ring of the thrust rolling bearing pressing respectively against the piston and against the first coupling part.

15. The transmission system as claimed in claim 4, wherein the second ring of the thrust rolling bearing is centered with respect to the first coupling part.

16. The transmission system as claimed in claim 4, wherein the first ring is made from non-magnetic material.

17. The transmission system as claimed in claim 7, wherein the first ring and the second ring are made of stainless steel and wherein the rolling bodies are made from a non-magnetic material selected from stainless steel and ceramics.

18. The transmission system as claimed in claim 2, wherein the piston comprises an end portion which collaborates with the thrust rolling bearing and which comprises one or more passages passing radially through it so as to allow lubricant to circulate radially through the piston.

19. The transmission system as claimed in claim 4, wherein of the first ring and the second ring of the thrust rolling bearing at least one comprises one or more passages passing radially through it so as to allow lubricant to circulate radially through said first or second ring.

* * * * *